INVENTORS.
JOSEPH G. MALONE
H. MORTON SMITH
BY
ATTORNEYS

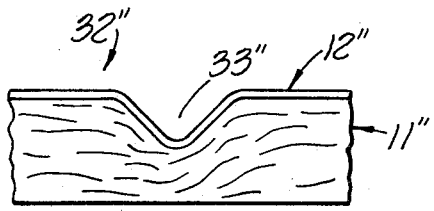
FIG. 8.
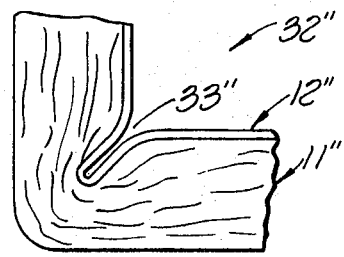
FIG. 9.
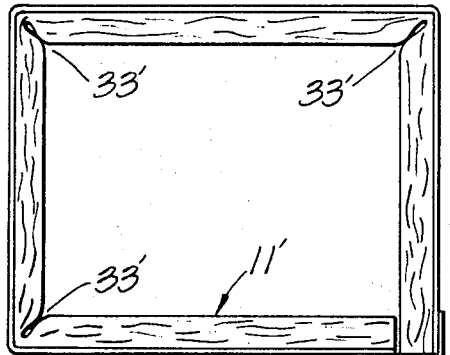
FIG. 10.
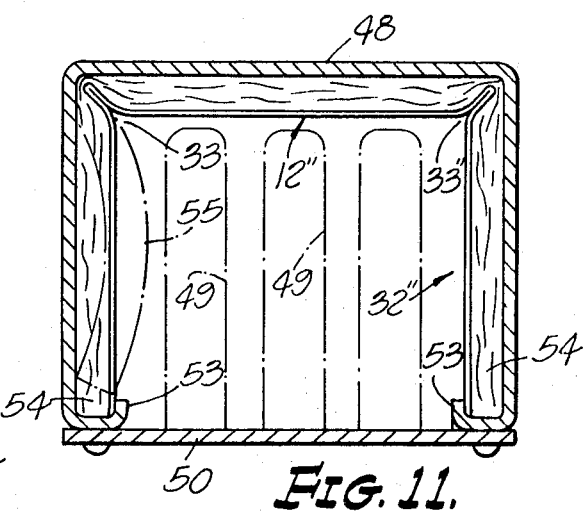
FIG. 11.
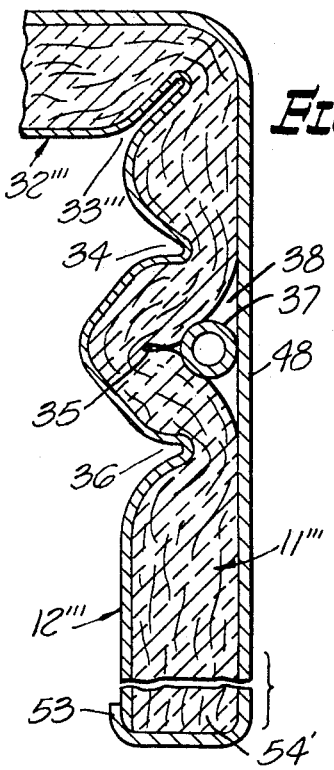
FIG. 12.
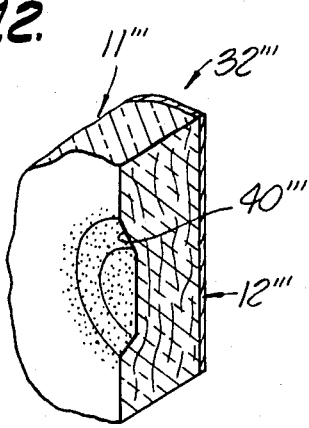
FIG. 14.
FIG. 13.
INVENTORS.
JOSEPH G. MALONE
H. MORTON SMITH
BY
ATTORNEYS

United States Patent Office 3,615,149
Patented Oct. 26, 1971

3,615,149
HEAT INSULATING PRODUCT
Joseph G. Malone, 576 Winston Ave., San Marino, Calif. 91108, and H. Morton Smith, 2373 Oak Ranch Road, La Habra, Calif. 90631
Filed Sept. 20, 1968, Ser. No. 761,156
Int. Cl. F16l 59/14
U.S. Cl. 138—151
13 Claims

ABSTRACT OF THE DISCLOSURE

A heat insulating product formed from a blanket of fiber glass by itself or laminated to foil or other flexible sheet material wherein the shape and density of one or more portions of the blanket have been permanently modified for a useful purpose as for example to fit about obstructions or to facilitate hinging of the blanket along a desired axis. The hinge has a pronounced memory and tendency to return to the normal state thereof as first made and can be flexed repeatedly without harmful effects. The material lends itself admirably to lining multi-sided chambers with a single plaque of either the laminated or nonlaminated material. The material is processed quickly and economically by the application of heat and pressure to seelcted areas and, if desired, such areas may be coated with a protective layer beneficial in strengthening and protecting such areas, or in holding adjacent portions of the blanket in diffeernt planes or positions.

---

This invention relates to heat insulating materials and techniques and more particularly to a method of treating resin-bonded fiber glass blanket to form a resilient hinge or a permanent depression of a desired shape and size without weakening the material.

Blankets of fiber glass of varying thicknesses and densities have many applications as lightweight resilient shock, load, and sound absorbing material and as a heat barrier or insulation either by themselves or laminated to other materials. A well-known objectionable characteristic of such material is the difficulty experienced in attempts to fold it along a desired line as well as to give it a different permanent shape. Any attempt to flex the material along a straight line invariably results in a sudden collapse or hinging of the material along an irregular line. Once such a break occurs, it is difficult to form a fold along a different line, particularly in reasonably close proximity to the irregular break. The results obtained by even the most careful attempts to fold the material along a desired straight line have been diverse and unpredictable and result in damage to the material. For these and the like reasons, it has long been accepted commercial practice to blank the material into pieces of such a size and shape that they can be installed flat in the operating environment. Not only is it costly and time-consuming to tailor the material and to install each individual plaque, but it has also been necessary to employ various fastener devices or adhesives to hold the plaques in their installed positions.

Another difficulty encountered in the use of fiber glass blanket material is the fact that it is oftentimes desirable to fit the material about obstructions present in the operating environment. The soft spongy and fibrous material is easily engaged and torn on rough surfaces or by any sharp or pointed object with resulting damage to the material and interference with its effectiveness. Moreover, its high resiliency causes the blanket to bridge the obstruction rather than to fit about and assume the shape thereof.

To overcome the aforementioned and many other disadvantages encountered in the use of this material, there is provided by this invention a simple technique and a greatly improved product whereby unitary plaques of fiber glass insulating material may be installed quickly relative to surfaces lying in different planes without need for shearing the material or modifying the continuity of the interlocked fibers or decreasing its insulating effectiveness at any point. The invention product is quickly and inexpensively formed with a resilient hinge along any line about which it is desired to fold or flex the sheet material without need for cutting or interrupting the fiber structure in any degree. The hinge formed in accordance with the invention principles has a pronounced memory and resiliency characteristics and tends to return the plaque to its original condition immediately upon release from any of many folded positions. If desired, and by using a variant of the basic technique of this invention, the material can be processed in a manner to impart a permanent modified position of selected areas or of portions of the blanket all as will become apparent from following portions of this specification.

According to a preferred procedure, a hinge is formed by compressing a narrow localized strip of the fibrous material along the desired hinge line and holding it depressed while applying heat for a sufficient time for the resin-coated fibers to take a set in the depressed position. The depression so formed is preferably of V-shape and permanently retains this normal configuration throughout repeated hinging cycle. If a coating of resinous material is applied to the surface of the fibers along the desired hinge line before the application of pressure, this material takes a permanent set in the configuration in which held during the application of pressure and heat. This coating protects the outermost fibers against snagging and strengthens them without interfering with the flexing of the coated area to any objectionable degree. If the blanket is held partially flexed about the axis of the depression during curing of the coating the blanket acquires a permanent new normal configuration in this partially hinged condition, it being understood that the material may be bent repeatedly along this hinge line following which the material tends to return to the built-in partially hinged position just referred to.

If the blanket is laminated to sheet material or heat-reflecting foil, the hinge depression may be formed from either face of the laminated material although it is preferable that the depression be on the face toward which the material is to be hinged. In other words, if the depression is formed from the foil face then the plaque is hinged in a direction to bring the foil faces closer together, whereas if the hinge is formed along the opposite face, the material hinges best in the opposite direction.

It is therefore a primary object of this invention to provide a simple, inexpensive technique for processing resin-bonded fiber glass material to facilitate hinging the material along a desired axis.

Another object of the invention is the provision of an improved resin-bonded porous fiber product and method of processing the same to provide it with a resilient hinge without materially or adversely affecting the properties and characteristics of the fibrous material.

Another object of the invention is the provision of a laminated heat reflecting and insulating product having one or more hinges thereacross without need for cutting, penetrating or interrupting the fibrous structure or puncturing the heat reflecting layer.

Another object of the invention is the provision of a one-piece heat barrier lining for a casing or other structure and provided with built-in resilient hinge means formed of the same material as the lining proper.

Another object of the invention is the provision of a one-piece liner of heat-insulating material for a casing, housing, or the like, installable in one piece and featuring a continuous impervious foil layer free of cut-outs or slits.

Another object of the invention is the provision of a simple, inexpensive technique for shaping a plaque of fiber glass and of providing the shaped area with a protective reinforcing layer of a selected configuration and effective to protect the fiber glass against damage while being installed about rough surfaces, pointed or sharp edges.

These and other more specific objects will appear upon reading the following specification and claims and upon considering in connection therewith the attached drawing to which they relate.

Referring now to the drawing in which a preferred embodiment of the invention is illustrated.

FIGS. 8 and 9 are fragmentary cross-sectional views of the laminated material processed with a hinge on the foil side of the lamination, FIG. 8 showing the material after being treated to form the hinge and FIG. 9 showing the material hinged through an arch of 90°;

FIG. 10 is a cross-sectional view of the invention product formed into a vapor-tight duct with its faced side facing outwardly;

FIG. 11 is a view similar to FIG. 10, but showing a one-piece heat-insulating lining installed in the heat-exchange chamber of a gas heater with the foil facing inwardly and employed as a hot air confining passage;

FIG. 12 is a fragmentary, cross-sectional view similar to FIG. 11, but showing the one-piece heat insulation processed to fit about a conduit or other obstruction interiorly of the casing;

FIG. 13 is a view similar to FIG. 12, and showing the insulation processed to fit about a projection extending into the space occupied by the insulation;

FIG. 14 is a fragmentary, sectional view in perspective taken through the insulation illustrated in FIG. 13.

Figure 1:
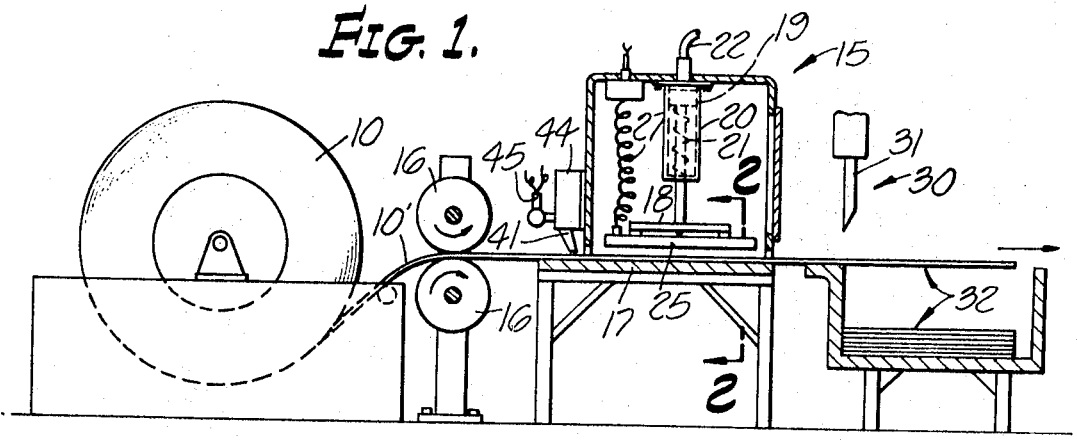
FIG. 1 is a generally schematic view, partly in section, of apparatus useful in processing continuous strips of resin-bonded fibrous material.
Figure 2:
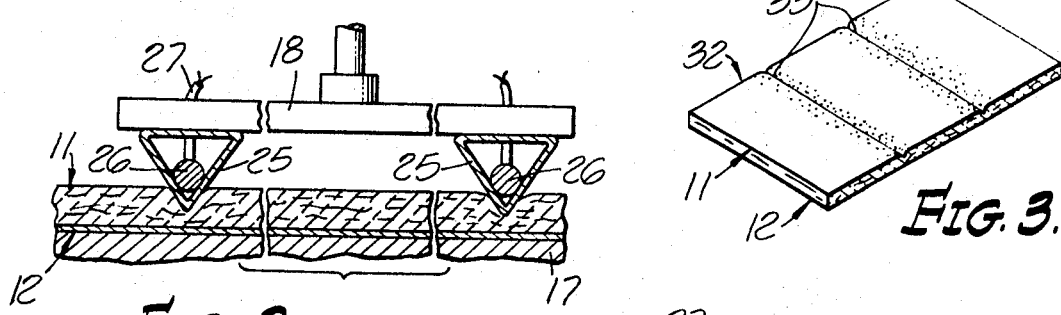
FIG. 2 is a cross-sectional view taken along line 2—2 on FIG. 1 showing one preferred mode of forming a hinge in fiber glass material.
Figure 3:
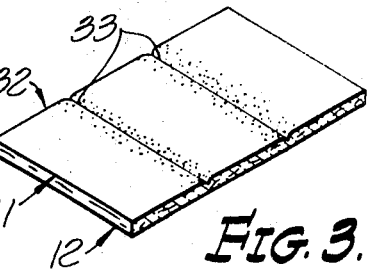
FIG. 3 is a perspective view of the product after severance from the supply strip.

Referring initially and more restrictively to FIGS. 1, 2 and 3, there is shown a large supply roll 10 of laminated heat-insulating material comprising a thick layer of randomly-arranged filaments of fiber glass bonded to a heat-reflecting sheet 12, such as aluminum foil. The randomly-arranged fiber glass filaments in layer 11 are held assembled in a desired density by a relatively sparse distribution of a resinous binder system, as for example, single phase phenolic resin or emulsified silicone resin binder system. These are merely representative of various resin systems of a thermosetting type suitable for use in holding the fibers together at points of cross-over. Such binders serve to control the basic size and relaxed shape of the blanket, the resiliency of the blanket being determined primarily by the highly elastic characteristic of the glass fiber in conjunction with the tensilized bonding characteristic of the resin binder.

We have found that the resinous binders present in fiber glass blankets while cured to the manufacturers final specifications still exhibit the capability to undergo additional polymerization in a manner causing the binder and the associated glass fibers to acquire a desired new shape, density and configuration. This is achieved by holding the fibers in the desired new position while applying heat at a temperature adequate to release additional and residue portions of volatiles thereby causing the complex resin molecules to form new and additional cross linkages while held in the new position. This further curing should be discontinued before the binder becomes brittle and non-pliant.

Normally, resin bonded fiber blankets using the binder systems identified above are cured at temperatures ranging between 400 and 700° F. and the application of heat is terminated substantially before all volatile constituents are released in order to achieve the degree of balance required by the manufacturer for the proper performance of his product. According to this invention, the blanket is processed to provide a modified configuration having highly adavntageous properties and characteristics by the application of further heat and preferably at a temperature of 600° F. or higher and up to 1000 or 1100° F. for a period decreasing as the temperature level increases.

Blankets of the type disclosed herein are generally of uniform thickness and density and have highly pronounced recovery capabilities to their original thickness upon release of a load placed thereon. If the material is partially compressed and heated to a temperature ranging between about 600 to 1000° F. the depressed area acquires a permanent set substantially in its depressed condition. For example, if a blanket 1" thick and having a density of 0.75 pound per cubic foot is held depressed to one-half its thickness for five seconds while heated to approximately 900° F., the depressed area takes a permanent set very close to one-half inch. Similar results are achieved if the material is held depressed for 12 seconds while the depressing platen is heated to 780° F. If the blanket is of greater density, as for example, 3 pounds per cubic foot and 1" thick, it is found that it acquires a permanent set while held depressed for six seconds by a platen heated to 1100° F., whereas a 10 second depression suffices if the platen is heated to 860° F. A blanket ¼" thick and having a 2 pound density takes a permanent set when held depressed for 10 seconds by a platen heated to 975° F.

Similar results are obtained with foil-laminated glass fiber blankets and irrespective of whether the heated platen is applied to the foil or the non-foil face of the blanket. If the platen is applied to the foil, it is desirable to avoid platen temperatures which will damage or melt the foil which is achieved by applying heat of lower temperature for a longer period of time. The use of higher temperatures tends to darken the binder immediately adjacent or in close proximity to the pressure-applying platen but such darkening can be avoided by the use of lower temperatures over a longer span.

As shown in FIGS. 1 and 2, the laminated blanket 10' is advanced to forming station 15 by a pair of power-driven feed rollers 16. The blanket is advanced across the upper surface of a rigid member 17 underlying a rigid frame 18 supported by a piston 19 operating in a cylinder 20. The piston is biased to its retracted position by compression spring 21 and is extended by pressurized fluid supplied from hose line 22.

Suitably secured to the underside of frame 18 are one or more heated pressure-applying mandrels or platens 25 here shown as comprising V-shaped members of good heat-conducting material each housing an electric heater. The latter are energized through a service cord 27.

As the treated blanket advances beyond the forming station 15 it passes into a shearing station 30 equipped with a power-operated shearing blade 31 operable in known manner to shear the blanket into plaques 32 of a desired size. A typical finished plaque 32, FIG. 3, has been procesed to provide a pair of V-shaped hinge channels 33 extending from edge to edge thereof.

Figure 4:
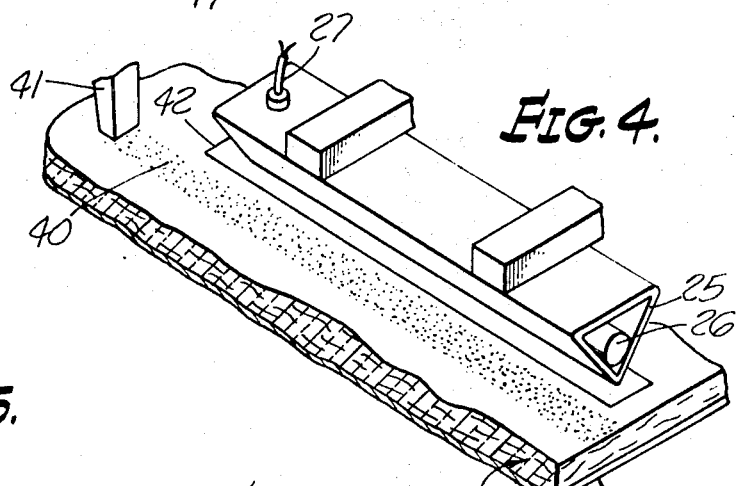
FIG. 4 is a fragmentary perspective view on an enlarged scale showing the manner of applying a reinforcing resin coating to the material prior to curing.
Figure 5:
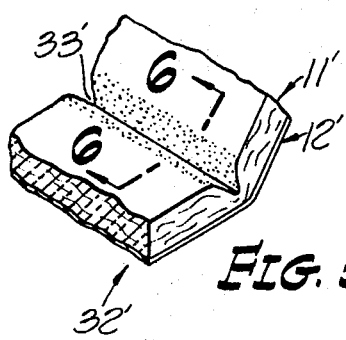
FIG. 5 is a fragmentary view after the material of FIG. 4 has been formed with a hinge while holding the main body of material partially hinged about the desired hinge axis.
Figure 6:
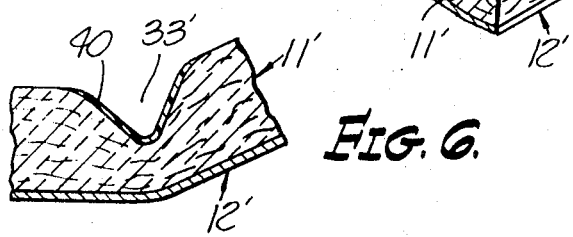
FIG. 6 is a fragmentary, cross-sectional view taken along line 6—6 on FIG. 5.
Figure 7:
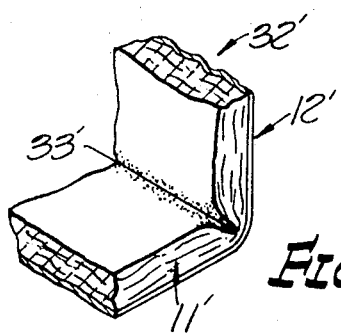
FIG. 7 is a fragmentary perspective view of the material shown in FIG. 6 after the latter has been hinged through an angle of approximately 90°.

Referring now to FIGS. 5 through 7, there is shown a variant embodiment of the product and a technique for preparing the same, the same or similar components being designated by the same reference characters referred to above but distinguished by the addition of a prime. The principal difference resides in coating the glass fibers in the area to be re-formed with a thick resin coating 40 which need not bridge the space between adjacent fibers, the coating being applied in any suitable manner as from a dispensing nozzle 41. As shown in FIG. 1, this nozzle may be located in the bottom of a hopper 44 and controlled by a solenoid valve 45. A suitable release member, such as a strip of foil 42 (FIG. 4), is preferably applied against the upper surface of the coating prior to lowering the heated platen 25. Thereafter the platen is heated to the desired temperature and pressed into the material 11' until the thermosetting resein 40 as well as that bonding the fiber glass filaments together has taken a set in the desired depressed configuration. It will be understood that coating 40 may comprise either of the thermosetting resin systems mentioned above for use in bonding the fibers of layer 11 to one another.

The portion of the blanket to the right of the hinge axis, as viewed in FIGS. 5 and 6, is shown inclined upwardly at an angle of 20 to 30 degrees which is the normal relaxed angle for the illustrated blanket after a reforming operation. This normal or natural relaxed condition of hinge 33' is that produced if the parts are held at approximately this angle while hinge 33' and coating 40 are taking a set. This blanket can be fully opened to its flat condition if pressure is applied to the halves to either side of the hinge, but, without pressure, the halves assume their manufactured positions. Likewise, the halves can be closed toward one another such as to the right angle position illustrated in FIG. 7.

It is pointed out that the additional thermosetting resin 40 not only provides the surface of reformed area with a smooth relatively tough and flexible protective coating, but this layer cooperates with the reformed resin in adjacent portions of the blanket in holding large adjacent areas of the blanket in a desired configuration.

The heat insulating blanket shown in FIGS. 8 and 9, blanket 32", differs in no material respect from that shown in FIG. 3 other than that hinge 33" has been formed from the foil side. Heat applied to the blanket through the depressed foil by platen 25 is radiated into the resin bonded fiber glass where it causes the molecules of the existing resin to cross link and take a firm set thereby to impart a different and desired configuration to the blanket. The finished product has a normal relaxed appearance as illustrated in FIG. 8 and assumes that shown in FIG. 9 when the two halves are folded to lie in the position shown in FIG. 9.

Among the many applications for a fibrous blanket embodying the principles and features of this invention are the typical ones illustrated in FIGS. 10 through 14 wherein the blanket serves as heat insulation, vapor barrier and as a gas duct. In each case the blanket is formed in one unitary piece with the different portions sized to conform to a side of a duct or the area of the surface against which the blanket is to be installed. FIG. 10 shows a one-piece laminated blanket 32' formed into a four-sided vapor-tight duct with the foil layer 12' outermost. The abutting edges of fiber glass layer 11 are sealed closed as by a strip of impervious tape 34 coated on its inner face with pressure-sensitive adhesive. The 34 may have a fiber reinforced plastic body and a covering of heat-reflecting foil. It will also be understood that the abutting surfaces of fiber glass 11' beneath tape 34 may be coated with a suitable adhesive, as epoxy, before being pressed together and held in this position by tape 34. The gas duct so formed may be of any desired length and employed as a gas conveying duct by itself or as an impervious snug-fitting jacket about another tubular member.

FIG. 11 shows a one-piece laminated blanket 32" installed in a U-shaped casing 48 of a heat exchanger as, for example, the heating chamber of a hot air furnace and with foil layer 12" facing inwardly and serving as any impervious side wall of the vertically arranged hot air duct. Located in this duct are radiators or hot flue gas ducts 49. A removable front closure plate 50 provides access to radiators 49 and may be held detachably assembled to casing 48 in any suitable manner. Retainer means for holding the blanket in place may be dispensed with because of the pronounced resiliency and memory of hinges 33 and 33" which always tend to open until the parts of the blanket resume their initial relaxed condition. This tendency does not appear to be adversely affected by the length of time the blanket is maintained folded. However, if desired, the edges of the access opening to casing 48 may be turned inwardly at 53 to embrace the adjacent end portion 54 of blanket 32 and hold it firmly installed. Installation is accomplished by inserting one edge 54 behind its retainer flange 53 following which the other end panel of the blanket is bowed as indicated by the dot and dash lines 55 until end 54 is behind the other flange 53 and then allowed to resume its flat installed condition.

FIG. 12 differs from FIG. 10 in that blanket 32''' is formed with certain additional hinge channels 34, 35 and 36 to facilitate folding the blanket to accommodate some obstruction, such as a conduit 37 extending along the interior of casing 48. It will also be understood that hinges 34–36 cooperate with adjacent portions of the blanket in forming a passage 38 which need not be occupied by an object such as conduit 37.

FIG. 13 shows another portion of blanket 32''' processed to fit firmly and snugly about an obstruction in the left hand side wall of casing 48 as, for example, an instrument 59 mounted in the casing wall. Portions of the instrument casing project into the space occupied by the insulating blanket and could easily snag the fibers of layer 11''' if the adjacent portion of the fibers are not properly preshaped and treated. This is accomplished by preforming the fiber glass layer 11''' with a depression of appropriate size and shape and coating the surface of the depression with a layer 40''' of thermosetting resin in the manner described above in connection with FIG. 3. This layer 40''' not only maintains the shape and size of the depression, but provides a form-filling protective smooth layer near the surface of the fiber glass and reduces any possibility of the fibers being snagged, torn or damaged during installation. Accordingly, it is understood that such a protective layer is desirably employed wherever the blanket is installed about structural elements, rough surfaces, or sharp objects likely to cause snagging or tearing of the fiber layer.

While the particular heat-insulating product and method herein shown and disclosed in detail is fully capable of attaining the objects and providing the advantages hereinbefore stated, it is to be understood that is merely illustrative of the presently preferred embodiments of the invention and that no limitations are intended to the detail of construction or design herein shown other than as defined in the appended claims.

We claim:

1. A layer of uniformly distributed fibrous materital comprising randomly arranged fibers held interlocked together at points of crossover by thermosetting binder material, said layer being further characterized in that the fibers in localized surface areas thereof are compressed more compactly transversely of the thickness of the layer than in other areas thereby substantially reducing the layer thickness in the areas of greater compactness and in that the fibers in said more densely compacted areas are held interlocked together by said binder material being more completely polymerized in said localized areas than the binder material in the less densely compacted areas of said fibers whereby to facilitate hinging or assembly of said fibrous material.

2. A layer of fibrous material as defined in claim 1 characterized in that said layer is laminated to a flexible layer of heat-reflecting material.

3. A layer of fibrous material as defined in claim 1 characterized in that said more compactly compressed areas are narrow and elongated and effective to provide a shallow trough-like indentation formed along the face of said layer.

4. A layer of fibrous material as defined in claim 3 characterized in that said layer of fibrous material is laminated to a flexible layer of heat reflecting material and in that said shallow trough-like indenation is formed along the heat-reflecting face thereof.

5. A layer of fibrous material as defined in claim 3 characterized in the presence of a layer of polymerized thermosetting resinous material extending along the surface area of said trough-like indentation.

6. A layer of fibrous material as defined in claim 3 characterized in that said shallow trough-like indentation extends in a straight line from edge to edge of said layer to form a hinge having a pronounced tendency to resume the shape and relative position occupied while being subjected to more complete polymerization after being released from a different position thereof.

7. A layer of fibrous material as defined in claim 1 characterized in that said fibers are uniformly and sparsely distributed to provide a layer having large voids in open communication with one another.

8. A layer of fibrous material as defined in claim 3 characterized in that said layer includes a plurality of straight narrow areas spaced form one another and having the fibers therein held in denser more compact array by the associated thermosetting binder material in more completely polymerized condition.

9. A layer as defined in claim 3 characterized in that said layer is laminated to a thin sheet of shiny heat reflecting material.

10. A layer as defined in claim 9 characterized in that said layer of laminated fibrous and heat reflecting material includes a plurality of trough-like indentations extending parallel to one another from edge to edge of said layer and spaced apart appropriately to form corner hinges interconnectnig adjacent sections of a one-piece liner for a multi-sided chamber.

11. A layer of fibrous material as defined in claim 3 characterized in that those fibers of said layer comprising said trough-like indentation have a pronounced tendency to retain the relative positions thereof occupied when subjected to more complete polymerization and a pronounced tendency to resume said relative positions after portions thereof contiguous to said trough-like indentation are flexed and then released.

12. A layer of fibrous material as defined in claim 11 characterized in that said layer of interlocked fibers includes a plurality of said trough-like indentations having similar pronounced tendencies to resume their nidividual predetermined positions after portions thereof contiguous to said trough-like indentations are fixed and then released.

13. In combination, a multi-sided casing for heat exchange means characterized by the provision of a one-piece plaque of heat-insulation held assembled against the juxtaposed sides of said casing and consisting essentially of randomly-arranged fiber glass held assembled in a resilient layer of generally uniform thickness by thermosetting resinous material at points of fiber cross-over, and said plaque having resilient hinge portions disposed to fit into the corners of said casing and comprising V-shaped channels permanently pre-formed in said layer of fiber glass and resiliently held in V-shape by thermosetting resinous material which has been subjected to more complete polymerization than the resinous material applied to portions of said one-piece plaque to either side of said V-shaped channels.

References Cited

UNITED STATES PATENTS

| | | | |
|---|---|---|---|
| 2,576,698 | 11/1951 | Russum | 161—119 |
| 3,066,061 | 11/1962 | Winslow | 161—157 |
| 3,067,806 | 12/1962 | Trelease | 161—123 |
| 3,117,902 | 1/1964 | Holzheimer | 161—123 |
| 3,003,902 | 10/1961 | McDuff | 161—120 |
| 3,070,476 | 12/1962 | Miller | 161—119 |

MORRIS SUSSMAN, Primary Examiner

U.S. Cl. X.R.

161—123; 264—295, 324; 156—209; 138—143